United States Patent Office 3,406,154
Patented Oct. 15, 1968

3,406,154
COPOLYESTER PRODUCTS
Donald Richard Wilson, Wilmington, Del., assignor to
E. I. du Pont de Nemours and Company, Wilmington,
Del., a corporation of Delaware
No Drawing. Filed May 14, 1965, Ser. No. 455,963
9 Claims. (Cl. 260—78.3)

ABSTRACT OF THE DISCLOSURE

Copolyesters consisting essentially of a succession of recurring structural units represented by the formulas

and

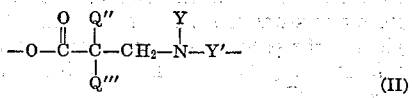

wherein Q, Q', Q", and Q''' are alkyl radicals of up to about six carbon atoms which may be joined to form alicyclic rings; Y and Y' are hydrocarbon radicals of up to about ten carbon atoms which may be joined to form rings; and the ratio of said units (Formulas I and II) is in the range of about 75/25 to 99.5/0.5, are found to have enhanced affinity for dyes.

---

This invention relates to new copolyesters of 2,2-dialkylhydracrylic acids, and to a novel process for producing such copolyesters.

Fibers of polymerized 2,2-dialkylhydracrylic acids are valuable for the production of a variety of textile products. An example of particular importance is the polymer of 2,2-dimethylphydracrylic acid (hydroxypivalic acid). However, the fibers of these polymers have a relatively low affinity for most dyes, a circumstance which severely restricts the suitability of the fibers for use in the production of colored products.

In accordance with the present invention, it has been found that markedly enhanced affinity for dyes is exhibited by a copolyester consisting of a succession of recurring ester structural units, from about 75 to about 99.5% of said ester structural units being oxycarbonyl-1,1-dialkyldimethylene radicals and the remaining 25 to 0.5% of said ester structural units consisting essentially of oxycarbonyl - 1,1 - dialkyldimethylene - N - hydrocarbyliminohydrocarbylene radicals.

The novel copolyesters of the invention are characterized by good initial color and high thermal stability. They are readily melt-spun to form fibers having excellent dyeability. In particular, the affinity of fibers of the copolyesters for the commercially important class of acid dyes is strikingly higher than that of fibers of the corresponding homopolyester. Copolyesters containing from about 0.5 to about 5 mol percent of the recurring oxycarbonyl-1,1-dialkyldimethylene - N - hydrocarbyliminohydrocarbylene structural units are generally employed for fibers having optimum physical properties as well as excellent dyeability. However, copolyesters containing from 5 to about 25 mol percent or even more of the amine-containing ester structural unit are useful for blending with 2,2-dialkylhydracrylic acid homopolysters.

More particularly described, the novel copolyesters of the invention are characterized as linear polymers consisting essentially of a succession of recurring structural units represented by the formulas

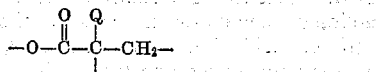

and

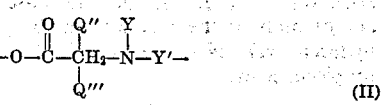

wherein Q, Q', Q", and Q''' are alkyl radicals of up to about six carbon atoms which may be joined to form alicyclic rings; Y and Y' are hydrocarbon radicals of up to about ten carbon atoms which may be joined to form alicyclic rings; and the ratio of said units (Formulas I and II) is in the range of about 75/25 to 99.9/0.5, respectively. Preferably, the ratio of said units is in the range of 95/5 to 99.5/0.5.

In accordance with the usage herein, Q, Q', Q", and Q''' are referred to as alkyl radicals; although it is to be understood that cyclic alkyl radicals are intended to be included and that Q and Q' may even be joined (with elimination of hydrogen atoms) to form alicyclic rings. As an example, Q+Q' may be pentamethylene, whereupon the radical of formula I becomes oxycarbonylcyclohexylidenemethylene. In analogous fashion, Q" and Q''' may be joined. Preferably, Q" is the same as Q, and Q''' is the same as Q', although they may be different. In the most preferred embodiment, Q=Q'=Q"=Q'''.

As indicated in the formulas, Y is monovalent and Y' is divalent. In accordance with the usage herein the monovalent hydrocarbon radical Y is referred to as a hydrocarbyl radical; and the divalent hydrocarbon radical Y' is referred to as a hydrocarbylene radical. Preferably, Y is alkyl and Y' is alkylene. It is to be understood that cyclic radicals are intended to be included and that Y and Y' may even be joined (with elimination of hydrogen atoms) to form alicyclic rings. Instances of the —NYY'— moiety containing such cyclic systems include the following:

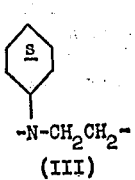
(III)

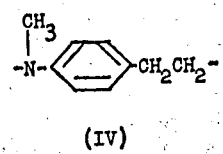
(IV)

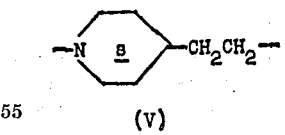
(V)

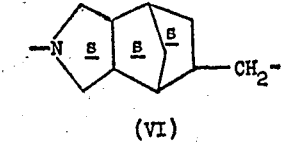
(VI)

wherein the symbol s denotes that the ring is saturated.

The homopolymer consisting of recurring structural units of Formula I is designated as poly(oxycarbonyl-1,1-dialkyldimethylene). Alternative names include multi (oxycarbonyl-1,1-dialkyldimethylene) and poly(2,2-dialkylhydracrylic acid). The polymer in which

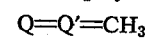
$Q = Q' = CH_3$ is designated as poly(oxycarbonyl-1,1-dimethyldimethylene), and it is also known by alternative names such as polypivalolactone and poly(hydroxypivalic acid). This polyester is readily prepared by the polymerization of hydroxypivalic acid or its esters as disclosed by Alderson in his U.S. Patent No. 2,658,055 or by the polymerization of pivalolactone, the intramolecular ester of hydroxypivalic acid, as disclosed by Reynolds and Vickers in their British Patent 766,347.

The novel copolyesters of the invention are readily prepared in general accordance with the method of Alderson by self-condensation of the appropriate hydroxyacids at elevated temperature and reduced pressure in the presence of a catalyst such as antimony trioxide, antimony trifluoride, a tetraalkyl titanate, or p-toluenesulfonic acid. Thus, the desired 2,2-dialkylhydracrylic acid is polymerized and there is incorporated into the reaction mixture at some stage prior to the end of polymerization 0.5 to 25 mol percent, based on the total number of mols in the reaction mixture, of an N-(hydroxyhydrocarbyl) - N - hydrocarbyl - 3 - amino - 2,2 - dialkylpropionic acid:

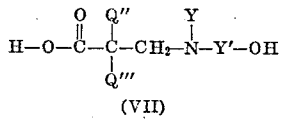

(VII)

Acids of the Formula VII are readily prepared by reacting the lactone of the appropriate 2,2-dialkylhydracrylic acid with an excess of the hydroxyamine, (HOY')YNH.

The copolymeric compositions so prepared are designated herein by listing the respective mol percentage values for each constituent of the mixed component. For instance, a copolyester comprised of 95% of the recurring structural units of Formula I and 5% of the recurring structural units of Formula II is designated poly(oxycarbonyl - 1,1 - dialkyldimethylene/oxycarbonyl - 1,1 - dialkyldimethylene - N - hydrocarbyliminohydrocarbylene) (95/5).

In the examples below, the term "inherent viscosity" is defined as the polymer property determined in accordance with the following relationship:

$$\eta_{inh} = \frac{\ln \eta \, rel.}{c.}$$

wherein the relative viscosity, $\eta_{rel}$, is calculated by dividing the flow time in a capillary viscometer of a dilute solution of the polymer by the flow time for the pure solvent, trifluoroacetic acid. The concentration (c.) used in the examples is 0.5 gram of polymer per 100 ml. of solution and a temperature of 30° C. is employed. It is desirable that the inherent viscosity be at least about 0.75 for fibers, 0.5 for films, and 0.08 for blending with other polymers.

The copolyesters of this invention have substantially more modifying units present per chain than could arise simply from incorporation of modifying units as endgroups of a polymer chain. The test employed herein for distinguishing such copolyesters from polymers merely containing an end-group modifier is the "Z Number," where Z Number = (mol percent modifier) $(\eta_{inh})^{1.25}$
>1 for copolyesters.

In accordance with this criterion, therefore, a copolyester is characterized by a Z Number greater than unity. For example, at an inherent viscosity of 0.75 at least 1.43 mol percent modification is required for classification of a polymer as a copolyester; and for 0.5 mol percent modification, the inherent viscosity must be at least 1.74. For 25 mol percent modification, the inherent viscosity must be at least 0.08.

Crystalline melting points as reported below are determined as the temperature at the peak of the major endotherm obtained by differential thermal analysis when the samples are heated in an atmosphere of nitrogen at 10° C. per minute.

The following example illustrates the preparation of a preferred embodiment of the novel copolyesters of the invention by melt condensation polymerization. In this copolyester the structural unit of Formula I is the oxycarbonyl-1,1-dimethyldimethylene radical, wherein

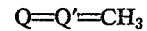

$$Q = Q' = CH_3$$

while the structural unit of Formula II is the oxycarbonyl-1,1 - dimethyldimethylene - 1,4 - piperidinediyldimethylene radical, VIII,

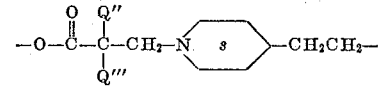

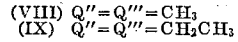

wherein Y and Y' of Formula II, together with the nitrogen atom to which they are attached, form the radical shown as Formula V.

Example 1

To a solution of 14.2 g. (0.110 mol) of 4-(2-hydroxyethyl)piperidine in 200 ml. of acetonitrile is added, all at one time, a quantity of 10.0 g. (0.100 mol) of pivalolactone. The mixture becomes cloudy within about 5 minutes. Stirring is continued for 6 hours, during which time a white crystalline solid is deposited. The reaction mixture is allowed to stand for 20 hours, after which the solid is collected on a Buchner funnel and recrystallized twice from a mixture of equal parts of ethanol and hexane. The yield of the product, 4-(2-hydroxyethyl)piperidinylpivalic acid, is 17.3 g. (76% of theory). It has a melting point of 169–171° C.

Analytical Data: Calculated for $C_{12}H_{23}NO_3$: C, 62.85; H, 10.11; N, 6.11; O, 20.93%. Found: C, 62.45, 62.92; H, 10.01, 9.95; O, 21.40, 21.34%.

A mixture of 20.0 g. (0.170 mol) of hydroxypivalic acid and 1 drop of tetraisopropyl titanate is heated for 18 hours atmospheric pressure in a 197° C. vapor bath while a slow stream of nitrogen is bubbled through the melt. The pressure is reduced to 0.5 mm. and heating at 222° C. is carried out for 4.7 hours. A quantity of 0.62 g. (0.00271 mol) of 4-(2-hydroxyethyl)piperidinylpivalic acid is added. The mixture is heated at 222° C. at atmospheric pressure for 1 hour with a nitrogen bleed and then for 18 hours at 0.5 mm. pressure. The product contains 0.20% nitrogen by analysis, corresponding to incorporation of approximately 1.5 mol percent of the 4-(2-hydroxyethyl)piperidinylpivalic acid. The nearly white copolyester, poly(oxycarbonyl-1,1-dimethyldimethylene/oxycarbonyl - 1,1 - dimethyldimethylene - 1,4 - piperidinediyldimethylene) (approximately 98.5/1.5), has an inherent viscosity of 0.90. The Z Number is 1.3, establishing that the product is a true copolyester rather than a polymer modified by end-groups only.

The copolyester is press-spun at 222° C. through an orifice 0.305 mm. (12 mils) in diameter, the resulting extruded filament being passed into ice water and wound up at 366 meters/min. (400 y.p.m.). The white filament is drawn 1.2× over a curved hot plate at 120° C. The fiber is dyed a deep shade of blue with C.I. 62.055 dye (the acid dye identified by Colour Index No. 62,055). The dyeing step is carried out at 100° C. for 2 hours, employing 0.25 g. of the fiber and 12.5 ml. of a dyebath comprising 0.08% dye, 0.05% sodium lauryl sulfate, and 2% acetic acid with the pH adjusted to 2.0 by trifluoroacetic acid. A control fiber of the corresponding homopolymer, poly(oxycarbonyl-1,1-dimethyldimethylene), adsorbs virtually none of the dye, being unstained when treated in the same dyebath by the same procedure.

In the example below the structural unit of Formula I is the oxycarbonyl-1,1-dimethyldimethylene radical, while the structural unit of Formula II is the oxycarbonyl-1,1-diethyldimethylene-1,4-piperidinediyldimethylene radical, IX.

Example 2

Following the general procedure of Example 1, 0.11 mol of 4-(2-hydroxyethyl)piperidine may be reacted with 0.1 mol of 2,2-diethylpropiolactone to produce 3-[4-(2-hydroxyethyl)piperidinyl]-2,2-diethylpropionic acid, and 0.00271 mol of this acid polymerized with 0.170 mol of hydroxypivalic acid. The product, poly(oxycarbonyl-1,1-dimethyldimethylene/oxycarbonyl - 1,1 - diethyldimethylene - 1,4 - piperidinediyldimethylene) (approximately 98.5/1.5), formed into fibers is dyed blue with C.I. 62,055 dye, using the dyeing method described in Example 1.

In the example below the structural unit of Formula II is the oxycarbonyl-1,1-dimethyldimethylene-1,3-piperidinediylmethylene radical,

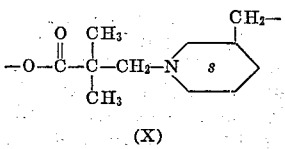

(X)

Example 3

Following the general procedure of Example 1, 0.011 mol of 3-hydroxymethylpiperidine may be reacted with 0.1 mol of pivalolactone to produce 3-hydroxymethylpiperidinylpivalic acid, and 0.00271 mol of this acid polymerized with 0.170 mol of hydroxypivalic acid. The product, poly(oxycarbonyl - 1,1 - dimethyldimethylene/oxycarbonyl-1,1-dimethyldimethylene - 1,3-piperidinediylmethylene) (approximately 98.5/1.5), formed into fibers is dyed blue with C.I. 62,055 dye, using the dyeing method described in Example 1.

In the example below the structural unit of Formula II is the oxycarbonyl-1,1-dimethyldimethylene-1,2-piperidinediyldimethylene radical,

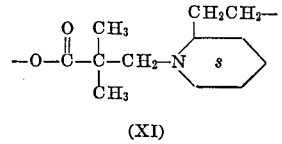

(XI)

Example 4

Following the general procedure of Example 1, 0.11 mol of 2-(2-hydroxyethyl)piperidine may be reacted with 0.1 mol of pivalolactone to produce 2-(2-hydroxyethyl)piperidinylpivalic acid, and 0.00271 mol of this acid polymerized with 0.170 mol of hydroxypivalic acid. The product, poly(oxycarbonyl-1,1-dimethyldimethylene/oxycarbonyl - 1,1 - dimethyldimethylene - 1,2-piperidinediyldimethylene) (approximately 98.5/1.5), formed into fibers is dyed blue with C.I. 62,055 dye, using the dyeing method described in Example 1.

In the example below the structural unit of Formula II is the oxycarbonyl-1,1-dimethyldimethylene-N-methyliminotrimethylene radical,

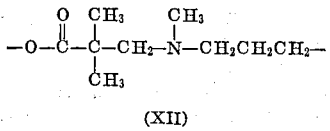

(XII)

Example 5

Following the general procedure of Example 1, 0.11 mol of N-methyl-3-hydroxypropylamine may be reacted with 0.1 mol of pivalolactone to produce N-methyl-N-(3-hydroxypropyl)aminopivalic acid, and 0.00271 mol of this acid polymerized with 0.170 mol of hydroxypivalic acid. The product, poly(oxycarbonyl-1,1-dimethyldimethylene/oxycarbonyl-1,1-dimethyldimethylene - N - methyliminotrimethylene) (approximately 98.5/1.5), formed into fibers is dyed blue with C.I. 62,055 dye, using the dyeing method described in Example 1.

In the example below the structural unit of Formula II is the oxycarbonyl - 1,1 - dimethyldimethylene-N-methylimino-1-methyltrimethylene radical,

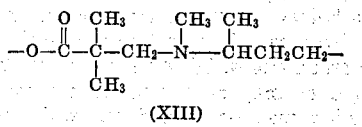

(XIII)

Example 6

Following the general procedure of Example 1, 0.11 mol of 3-methylamino-n-butanol may be reacted with 0.1 mol of pivalolactone to produce N-methyl-N-(3-hydroxy-1-methylpropyl)aminopivalic acid, and 0.00271 mol of this acid polymerized with 0.170 mol of hydroxypivalic acid. The product, poly(oxycarbonyl-1,1-dimethyldimethylene/oxycarbonyl-1,1-dimethyldimethylene - N - methylimino-1-methyltrimethylene) (approximately 98.5/1.5), formed into fibers is dyed blue with C.I. 62,055 dye, using the dyeing method described in Example 1.

In the example below the structural unit of Formula II is the oxycarbonyl-1,1-dimethyldimethylene-N-isopropyliminodimethylene radical,

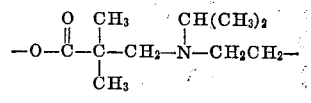

(XIV)

Example 7

Following the general procedure of Example 1, 0.11 mol of N-(2-hydroxyethyl)isopropylamine may be reacted with 0.1 mol of pivalolactone to produce N-(2-hydroxyethyl)-N-isopropylaminopivalic acid, and 0.00271 mol of this acid polymerized with 0.170 mol of hydroxypivalic acid. The product, poly(oxycarbonyl-1,1-dimethyldimethylene/oxycarbonyl - 1,1 - dimethyldimethylene-N-isopropyliminodimethylene) (approximately 98.5/1.5), formed into fibers is dyed blue with C.I. 62,055 dye, using the dyeing method described in Example 1.

In the example below the structural unit of Formula II is the oxycarbonyl - 1,1 - dimethyldimethylene-N-hexyliminodimethylene radical,

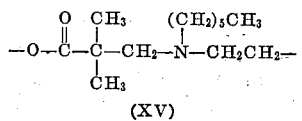

(XV)

Example 8

Following the general procedure of Example 1, 0.11 mol of N-(2-hydroxyethyl)hexylamine may be reacted with 0.1 mol of pivalolactone to produce N-(2-hydroxyethyl)-N-hexylaminopivalic acid, and 0.00271 mol of this acid polymerized with 0.170 mol of hydroxypivalic acid. The product, poly-(oxycarbonyl-1,1-dimethyldimethylene/oxycarbonyl - 1,1 - dimethyldimethylene - N - hexyliminodimethylene) (approximately 98.5/1.5), formed into fibers is dyed blue with C.I. 62,055 dye using the dyeing method described in Example 1.

The invention also comprehends a novel alternative process for producing the novel copolyesters, in which the polymerization of monomeric 2,2-disubstituted propiolactones is initiated by cyclic tertiary amines which open to become repeating copolymeric structural units within the polymer chain. In accordance with the invention a 2,2-dialkylpropiolactone having the formula

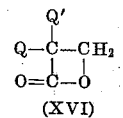

(XVI)

wherein Q and Q' have the values defined above, is mixed with from 0.5 to 25 mol percent or more of a tertiary amine of the class consisting of (1) 1-azapolycycloalkanes consisting of one nitrogen atom and from 6 to 12 carbon atoms in the polycyclic ring system; (2) N-hydrocarbylaziridines; (3) N-hydrocarbylazetidines; and (4) N-hydrocarbylpyrrolidines. In the latter three members of the class, the hydrocarbyl radical may contain from 1 to about 10 carbon atoms. Of course, inert substituents such as alkyl groups may be present in the molecule. The polymerization may be carried out with the undiluted mixture of the lactone and the amine; or a suitable solvent such as hexane, tetrahydrofuran, or acetonitrile may be employed. In most instances the polymerization proceeds spontaneously, but heat is preferably applied to the reaction mixture to carry the polymerization to the desired high molecular weights.

In a preferred embodiment of the process of the invention pivalolactone, XVII, is polymerized in the presence of quinuclidine, XVIII. The reaction is believed to proceed in accordance with the following sequence, although this statement is not intended to be limiting:

for 2 hours. The product is collected by filtration, washed with acetonitrile, and dried at 130° C. overnight in a vacuum oven, using a nitrogen bleed. It contains 0.29% nitrogen by analysis, corresponding to incorporation of 2 mol percent of the quinuclidine. The yield of copolyester, poly(oxycarbonyl - 1,1-dimethyldimethylene/oxycarbonyl - 1,1-dimethyldimethylene-1,4-piperidinediyldimethylene) (98/2), is 14.4 g. It has an inherent viscosity of 1.62 and a crystalline melting point of 219° C. The Z Number is 3.7, establishing that the product is a copolyester.

The copolyester is press-spun at 238° C. through an orifice 0.305 mm. (12 mils) in diameter, the resulting extruded filament being passed into ice water and wound at 366 meters/min. (400 y.p.m.). The filament is drawn 1.4× over a curved hot plate at 145° C. and boiled off by immersion in boiling water for 30 minutes. The filament has a denier of 5.1, a tenacity of 4.2 g.p.d., an elonga-

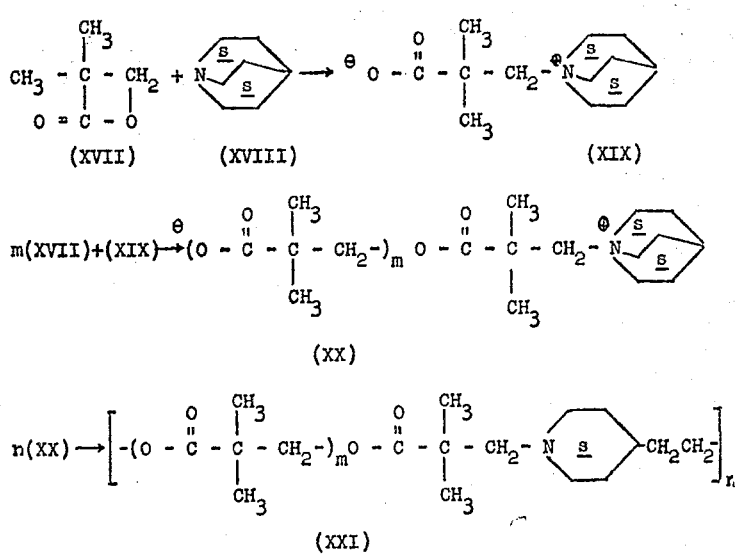

In the above sequence, the zwitter-ion first formed, XIX, initiates polymerization of $m$ additional molecules of pivalolactone, where $m$ is a number ranging from about 3 to 200, to form the polymeric intermediate zwitter-ion, XX. Opening of the charged ring, a process accelerated by heat, by combination with formation of ester linkages, results in the formation of the copolymer XXI of high molecular weight from $n$ of the polymeric intermediate zwitter-ions XX, where $n$ is a number ranging from about 3 to about 200.

The sequence of reactions described above represents an alternative process for forming the copolymeric product of Example 1. It will be noted that Formula XXI is comprised of recurring structural units of Formula I, wherein Q=Q=CH₃ and the unit is the oxycarbonyl-1,1-dimethyldimethylene radical, together with the structural unit of Formula VIII, the oxycarbonyl-1,1-dimethyldimethylene-1,4-piperidinediyldimethylene radical.

The following two examples illustrate the preparation of this copolymer from pivalolactone and quinuclidine by both solution polymerization and melt polymerization.

Example 9

A slow stream of nitrogen is initiated into a flame-dried, 500-ml., 3-necked flask equipped with a blade stirrer and condenser. Into the flask are palced 140 ml. of anhydrous acetonitrile and 0.67 g. (0.0060 mol) of quinuclidine. The mixture is stirred at room temperature while 14.5 g. (0.145 mol) of pivalolactone is added together with a 10 ml. rinse of acetonitrile. After 5 minutes of stirring, during which time precipitation of polymer begins, heating is commenced and the mixture is refluxed tion of 67%, an initial modulus of 31 g.p.d., a work recovery at 5% elongation of 69%, and a tensile recovery at 5% elongation of 91%. Another sample of the filament, when heated taut for 2 hours at 170° C. under an atmosphere of nitrogen prior to boil-off, has a denier of 5.3, a tenacity of 4.5 g.p.d., an elongation of 59%, an initial modulus of 34 g.p.d., a work recovery at 5% elongation of 81%, and a tensile recovery at 5% elongation of 93%.

The fiber is dyed to a deep shade of blue with C. I. 62,055 dye. The dye bath for this example comprises 9.2 ml. of water, 1 drop of 10% sodium lauryl sulfate solution, and 0.8 ml. of a 1% dye solution prepared by pasting 1 g. of dye in a few ml. of water and then diluting to 100 ml. with water. The pH of the dye bath is adjusted to 2.0 with 4 N hydrochloric acid and the bath is then placed in a glass ampoule together with 0.2 g. of the fiber. The ampoule is sealed and rotated in a hot box maintained at 125° C. The samples of dyed fiber are rinsed well with water and scoured for 15 minutes at 85° C. in a 1% solution of sodium lauryl sulfate.

The polymerization procedure is repeated, half of the refluxed polymerization product which is collected by filtration being dried in a vacuum desiccator at room temperature over P₂O₅ at a pressure of 0.5 mm. of mercury and half being dried at 140° C. in a vacuum oven. The product dried at room temperature contains 0.33% nitrogen by analysis, corresponding to incorporation of 2.4 mol percent of the quinuclidine. The molecular weight of this product, calculated on the assumption that it is the polymeric intermediate zwitter-ion XX containing only one nitrogen atom, would be 4,200. By actual measurement, this product has an inherent viscosity of 0.33, corresponding to a molecular weight of about 6,300 as estimated by the empirical equation $$\eta_{inh} = 3.0 \times 10^{-4} (MW)^{0.8}$$

The Z number is only 0.6.

This substantiates that the product dried at room temperature has undergone relatively little chain combination and that much of the polymer exists in a form containing only one nitrogen atom per molecule, as in Formula XX. It is therefore not considered to be a true copolyester. Since pivalolactone has a molecular weight of 100 and quinuclidine a molecular weight of 111, the product dried at room temperature is comprised of approximately 63 repeating units. The sample of copolymer dried at 140 C. has an inherent viscosity of 2.2, however, corresponding to a molecular weight of 68,000 or approximately 680 repeating units, illustrating the chain combining reaction induced by the heating step to form the copolymer XXI of high molecular weight. The Z Number is increased to 6.3.

The general procedure described above for preparing the copolymer is repeated, using 0.93 g. (0.0084 mol) of quinuclidine, 20 g. (0.20 mol) of pivalolactone, and 200 ml. of anhydrous acetonitrile. The product, poly(oxycarbonyl - 1,1-dimethyldimethylene/oxycarbonyl-1,1-dimethyldimethylene-1,4-piperidinediyldimethylene) (98.5/1.5), has an inherent viscosity of 0.93. The Z Number is 1.4. The infrared spectrum of this copolyester is identical with the spectrum of the copolyester of Example 1.

The polymerization reaction is repeated in a more concentrated solution, employing 150 ml. of acetonitrile, 1.68 g. (0.015 mol) of quinuclidine, and 36.3 g. (0.363 mol) of pivalolactone. A nearly quantitative yield of a copolyester of similar properties is obtained.

Example 10

Into a flame-dried, 50-ml. flask immersed in an ice bath is added 29.1 g. (0.291 mol) of pivalolactone and 1.00 g. (0.0090 mol) of quinuclidine. The mixture is stirred with a magnetic stirrer and becomes opaque within approximately one minute. The cold milky liquid is transferred to a previously flame-dried polymer tube in an atmosphere of nitrogen. Polymerization becomes vigorous immediately. After the tube has cooled, the polymeric product is ground and is then dried overnight in a vacuum oven at 130° C., using a nitrogen bleed. It contains 0.11% nitrogen by analysis, corresponding to incorporation of 0.8 mol percent of the quinuclidine. The copolyester, poly(oxycarbonyl - 1,1 - dimethyldimethylene/oxycarbonyl-1,1-dimethyldimethylene-1,4 - piperidinediyldimethylene) (99.2/0.8) has an inherent viscosity of 5.94 and a crystalline melting point of 225° C. The Z Number is 7.4. The copolyester is dyed to a medium shade of blue with C.I. 62,055 dye, using the dyeing procedure described in Example 9.

The following two examples illustrate the preparation of another preferred embodiment of the invention, the copolyester derived from pivalolactone and isogranatanine, XXII.

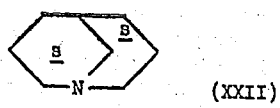

This amine is also known as 1-azabicyclo[3.3.1]nonane. In the copolyester, the structural unit of Formula I is the oxycarbonyl-1,1-dimethyldimethylene radical, wherein $Q=Q'=CH_3$. The structural unit of Formula II is a mixture of radicals in this instance, since either the methylene bridge or the trimethylene bridge of the isogranatanine ring may open. The copolyester accordingly consists of the following structural units:

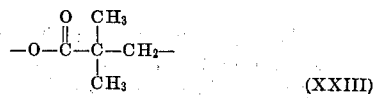

(XXIII)

and

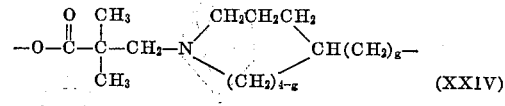

(XXIV)

wherein $g$ is selected from the class consisting of 1 and 3. It is believed that the radicals wherein $g=3$ predominate, although this statement is not intended to be limiting.

Example 11

Employing the general procedure of Example 9, 14.3 g. (0.143 mol) of pivalolactone is reacted with 0.94 g. (0.0075 mol) of isogranatanine in 150 ml. of acetonitrile. The product collected by filtration is dried at 150° C. overnight in a vacuum oven, using a nitrogen bleed. It contains 0.25% nitrogen by analysis and is accordingly composed of 98.2% structural units of Formula XXIII and 1.8% structural units of Formula XXIV. The yield of the copolyester is 14.1 g. (93% of theory). It has an inherent viscosity of 1.37 and a crystalline melting point of 212° C.

The copolyester is spun and drawn as in Example 9, except that the spinning temperature is 230° C. and the draw ratio is 1.8×. The filament has a denier of 12.8, a tenacity of 3.7 g.p.d., an elongation of 78%, an initial modulus of 26 g.p.d., a work recovery at 5% elongation of 73%, and a tensile recovery at 5% elongation of 93%. Another sample of the filament, when heated taut for 2 hours at 175° C. under an atmosphere of nitrogen prior to boil-off, has a denier of 13.0, a tenacity of 3.2 g.p.d., an elongation of 81%, an initial modulus of 26 g.p.d., a work recovery at 5% elongation of 80%, and a tensile recovery at 5% elongation of 93%. The fibers are dyed to a medium shade of blue with C.I. 62,055 dye, using the dyeing procedure described in Example 9.

A small sample of the product collected by filtration in the above procedure is dried for 20 hours over $P_2O_5$ at a pressure of 1 mm. of mercury at room temperature instead of at 150° C. as above. The product dried at room temperature has an inherent viscosity of only 0.26, corresponding to a molecular weight of about 4,700 as estimated by the empirical equation given in Example 9. The Z Number is only 0.3; thus, the product is not considered a true copolyester. By contrast, the product dried at 150° C. and having an inherent viscosity of 1.37 has an estimated molecular weight of 37,500 according to the same equation, illustrating the extent of the chain-combining reaction. The Z Number is now 2.7.

Example 12

Employing the general procedure of Example 10, 19.0 g. (0.19 mol) of pivalolactone and 1.25 (0.01 mol) of isogranatanine are reacted together. The polymeric product is ground and is then dried overnight in a vacuum oven at 150° C., using a nitrogen bleed. It contains 0.08% nitrogen by analysis and is accordingly composed of 99.4% structural units of Formula XXIII and 0.6% structural units of Formula XXIV. It has an inherent viscosity of 2.41 and a crystalline melting point of 226° C. The Z Number is 1.8.

The copolyester is spun and drawn as in Example 9, except that the spinning temperature is 255° C. and the draw ratio is 1.7×. The filament has a denier of 5.7, a tenacity of 3.5 g.p.d., an elongation of 32%, an initial modulus of 34 g.p.d., a work recovery at 5% elongation of 61%, and a tensile recovery at 5% elongation of 85%.

The fibers are dyed to a medium shade of blue with C.I. 62,055 dye, using the dyeing procedure described in Example 9.

The following two examples illustrate the preparation of the copolyester derived from pivalolactone and 1-azabicyclo-[2.2.1]heptane, XXV.

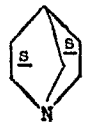  (XXV)

The copolyester accordingly consists of the structural units of Formula XXIII and Formula XXVI,

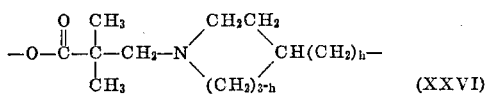 (XXVI)

wherein $h$ is selected from the class consisting of 1 and 2. It is believed that the radicals wherein $h=2$ predominate, although this statement is not intended to be limiting.

Example 13

Employing the general procedure of Example 10, 20.0 g. (0.200 mol) of pivalolactone and 0.30 g. (0.0031 mol) of 1-azabicyclo[2.2.1]heptane are reacted together. The polymeric product is chopped up and then ground in a micropulverizer. It contains 0.18% nitrogen by analysis and is accordingly composed of 98.7% structural units of Formula XXIII and 1.3% structural units of Formula XXVI. It has an inherent viscosity of 3.18 and a crystalline melting point of 232° C. The Z number is 5.5.

The copolyester is spun and drawn as in Example 9, except that the spinning temperature is 260° C. and the hot plate temperature is 130° C. The filament has a denier of 5.2, a tenacity of 4.4 g.p.d., an elongation of 73%, an initial modulus of 33 g.p.d., a work recovery at 5% elongation of 64% and a tensile recovery at 5% elongation of 90%. The fiber is dyed to a medium shade of blue with C.I. 62,055 dye, using the dyeing procedure described in Example 9.

Example 14

Employing the general procedure of Example 9, 14.7 g. (0.147 mol) of pivalolactone is reacted with 0.45 g. (0.0046 mol) of 1-azabicyclo[2.2.1]heptane in 150 ml. of anhydrous acetonitrile. The product collected by filtration is dried overnight at 120° C. in a vaccum oven, using a nitrogen bleed. It contains 0.35% nitrogen by analysis and is accordingly composed of 97.4% structural units of Formula XXIII and 2.6% structural units of Formula XXVI. It has an inherent viscosity of 2.12 and a crystalline melting point of 222° C. The Z number is 6.6.

The copolyester is spun and drawn as in Example 9, except that the spinning temperature is 243° C., the draw ratio is 1.5×, and the hot plate temperature is 130° C. The filament has a denier of 7.1, a tenacity of 4.1 g.p.d., an elongation of 70%, an initial modulus of 24 g.p.d., a work recovery at 5% elongation of 67%, and a tensile recovery at 5% elongation of 78%. The fiber is dyed to a deep shade of blue with C.I. 62,055 dye, using the dyeing procedure described in Example 9.

The following example illustrates the preparation of the copolyester derived from pivalolactone and pyrrolizidine, XXVII.

(XXVII)

This amine is also known as 1-azabicyclo[3.3.0]octane.

The copolyester accordingly consists of the structural units of Formula XXIII and Formula XXVIII,

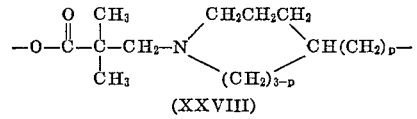

(XXVIII)

wherein $p$ is selected from the class consisting of 0 and 3. It is believed that the radicals wherein $p=3$ predominate, although this statement is not intended to be limiting.

Example 15

Employing the general procedure of Example 9, 14.3 g. (0.143 mol) of pivalolactone is reacted with 0.83 g. (0.0075 mol) of pyrrolizidine in 150 ml. of anhydrous acetonitrile. The product collected by filtration is dried overnight at 150° C. in a vacuum oven, using a nitrogen bleed. It contains 0.23% nitrogen by analysis and is accordingly composed of 98.3% structural units of Formula XXIII and 1.7% structural units of Formula XXVIII. It has a crystalline melting point of 226° C. and an inherent viscosity of 1.56, corresponding to a molecular weight of about 43,000 as estimated by the empirical equation given in Example 9. The Z number is 3.0. A small sample of the product collected by filtration in the above procedure but dried over $P_2O_5$ under vacuum at room temperature instead of 150° C. exhibits an inherent viscosity of only 0.53, corresponding to a molecular weight of about 11,500 as estimated by the same equation. The Z number is only 0.8; thus, the product dried at room temperature is not considered a true copolyester. The copolyester dried at 150° is spun and drawn as in Example 9, except that the spinning temperature is 226° C. The fiber is dyed to a medium shade of blue with C.I. 62,055 dye, using the dyeing procedure described in Example 9.

The following example illustrates the preparation of the copolyester derived from pivalolactone and conidine, XXIX.

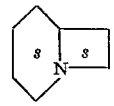 (XXIX)

This amine is also known as 1-azabicyclo[4.2.0]octane. The copolyester accordingly consists of the structural units of Formula XXIII and Formula XXX,

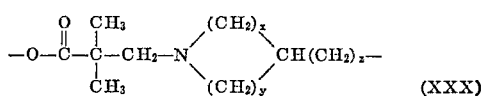 (XXX)

wherein $x$, $y$, and $z$ are selected from the class consisting of 4, 2, and 0 and no two of the subscripts are alike. The copolyester of Example 4 contains units of Formula XXX where $x=4$, $y=0$, and $z=2$.

Example 16

Employing the general procedure of Example 10, 19.4 g. (0.194 mol) of pivalolactone and 0.67 g. (0.0060 mol) of conidine are reacted together. The polymeric product is ground and is then dried overnight in a vacuum oven at 140° C., using a nitrogen bleed. It contains 0.43% nitrogen by analysis and is accordingly composed of 96.8% structural units of Formula XXIII and 3.2% structural units of Formula XXX. It has an inherent viscosity of 0.95 and a crystalline melting point of 222° C. the Z number is 3.0.

The copolyester is spun and drawn as in Example 9, except that the spinning temperature is 232° C. and the draw ratio is 2×. The filament has a denier of 8.5, a tenacity of 2.9 g.p.d., an elongation of 66%, an initial modulus of 26 g.p.d., a work recovery at 5% elongation of 58% and a tensile recovery at 5% elongation of 83%. The fiber is dyed to a deep shade of blue with C.I. 62,055 dye, using the dyeing procedure described in Example 9.

The following example illustrates the preparation of the copolyester derived from pivalolactone and cyclocamphidine, XXXI.

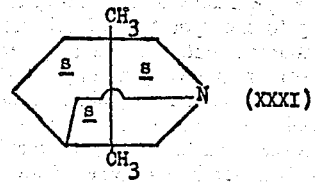

This amine is also known as hexahydro-3a,4-dimethyl-1H-2,4-methanocyclopenta[c]pyrrole. The copolyester accordingly consists of the structural units of Formula XXIII and Formula XXXII,

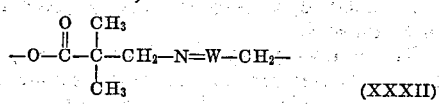

wherein W is a trivalent $C_9H_{15}$ radical which, together with the nitrogen atom and methylene group to which it is attached, is derived by severing one of the three carbon-to-nitrogen bonds of the cyclocamphidine molecule.

Example 17

Employing the general procedure of Example 9, 14.6 g. (0.146 mol) of pivalolactone is reacted with 0.68 g. (0.0045 mol) of cyclocamphidine in 150 ml. of anhydrous acetonitrile. The product collected by filtration is dried overnight at 150° C. in a vacuum oven, using a nitrogen bleed. It contains 0.36% nitrogen by analysis and is accordingly composed of 97.3% structural units of Formula XXIII and 2.7% structural units of Formula XXXII. It has a crystalline melting point of 219° C. and an inherent viscosity of 0.99, corresponding to a molecular weight of about 24,500 as estimated by the empirical equation given in Example 9. The Z Number is 2.7. A small sample of the product collected by filtration in the above procedure but dried over $P_2O_5$ under vacuum at room temperature instead of 150° C. exhibits an inherent viscosity of only 0.37, corresponding to a molecular weight of about 7,100 as estimated by the same equation. The Z Number is only 0.8; thus, the product dried at room temperature is not considered a true copolyester. The copolyester dried at 150° C. is spun and drawn in Example 9. The fiber is dyed to a deep shade of blue with C.I. 62,055 dye, using the dyeing procedure described in Example 9.

The following example illustrates the preparation of the copolyester derived from pivalolactone and 1-ethylaziridine, XXXIII.

This amine is also known as N-ethylethyleneimine. The copolyester accordingly consists of repeating structural units of oxycarbonyl-1,1-dimethyldimethylene (Formula XXIII) and oxycarbonyl-1,1-dimethyldimethylene-N-ethyliminodimethylene.

Example 18

A freshly prepared solution of 0.355 g. (0.0050 mol) of 1-ethylaziridine in 20.0 g. (0.200 mol) of pivalolactone is placed in a flame-dried polymer tube under an atmosphere of nitrogen. After thirty minutes, the solution has become jelled and opaque, after which it is heated gently with a flame until it commences to boil. The polymerization reaction proceeds rapidly, resulting in a white polymer plug, which is then chopped up and ground in a micropulverizer. It contains 0.26% nitrogen by analysis, corresponding to incorporation of 1.9 mol percent of the N-ethylaziridine. The copolyester, poly(oxycarbonyl-1,1-dimethyldimethylene/oxycarbonyl - 1,1 - dimethyldimethylene-N-ethyliminodimethylene) (98.1/1.9) has an inherent viscosity of 2.75 and a crystalline melting point of 233° C. The Z Number is 6.7.

The copolyester is spun and drawn as in Example 9, except that the spinning temperature is 247° C., the draw ratio is 1.8×, and the draw temperature is 125° C. The filament has a denier of 3.5, a tenacity of 3.1 g.p.d., an elongation of 62%, an initial modulus of 18 g.p.d., a work recovery at 5% elongation of 64%, and a tensile recovery at 5% elongation of 74%. The fiber is dyed to a medium shade of blue with C.I. 62,055 dye, using the dyeing procedure described in Example 9.

The following example illustrates the preparation of copolyesters of high nitrogen content from pivalolactone and 1-methylaziridine, followed by blending with polypivalolactone to produce fiber-forming copolymer of the desired nitrogen content for good dyeability.

Example 19

Employing the general procedure of Example 9, 13.5 g. (0.135 mol) of pivalolactone is reacted with 1.55 g. (0.027 mol) of 1-methylaziridine in 150 ml. of anhydrous acetonitrile. The product collected by filtration is dried overnight at 75° C. in a vacuum oven, using a nitrogen bleed. It contains 1.84% nitrogen by analysis, corresponding to 14.2 mol percent of the amine-containing-unit. The yield of copolyester, poly(oxycarbonyl - 1,1 - dimethyldimethylene/oxycarbonyl-1,1-dimethyldimethylene-N-methyliminodimethylene) (85.8/14.2), is 13.6 g. It has an inherent viscosity of 0.49 and a crystalline melting point of 207° C. The Z Number is 5.8.

A blend of 3.0 g. of the copolyester prepared as described above and 17.0 g. of polypivalolactone having an inherent viscosity of 1.56 is press-spun at 250° C. through an orifice 0.305 mm. (12 mils) in diameter, the resulting extruded filament being passed into ice water and wound at 457 meters/min. (500 y.p.m.). The filament is drawn 2× at 130° C. and boiled off. The filament has a denier of 4.2, a tenacity of 4.7 g.p.d., an elongation of 53%, an initial modulus of 35 g.p.d., a work recovery at 5% elongation of 67%, and a tensile recovery at 5% elongation of 90%. It is dyed to a deep shade of blue with C.I. 62,055 dye, using the dyeing procedure described in Example 9.

In a similar preparation, a solution of 150 g. (1.50 mol) of pivalolactone and 15.0 g. (0.263 mol) of N-methylaziridine is added to 1,500 ml. of anhydrous acetonitrile and the general procedure described above is repeated to form a copolyester containing 0.87% nitrogen by analysis, corresponding to 6.5 mol percent of the amine-containing unit. The copolyester, poly(oxycarbonyl-1,1-dimethyldimethylene/oxycarbonyl - 1,1 - dimethyldimethylene-N-methylimidimethylene) (93.5/6.5), has an inherent viscosity of 0.57 and a crystalline melting point of 222° C. The Z Number is 3.2. A blend of 125 g. (15.4%) of the copolyester, 675 g. (83.1%) polypivalolactone and 12 g. (1.5%) diphenylolpropane is blended. The blend has an inherent viscosity of 1.63, a crystalline melting point of 233° C., and contains 0.14% nitrogen by analysis, corresponding to 1 mol percent units derived from N-methylaziridine. The blend is screw-extruded at 250° C. through a spinneret containing 15 orifices, each 0.229 mm. (9 mils) in diameter. The resulting extruded filaments are passed into ice water, drawn 1.12× between two rolls, and wound at 792 meters/min. (867 y.p.m.). After boil off, the yarn has an inherent viscosity of 1.20, a denier per filament of 2.9, a tenacity of 3.2 g.p.d., an elongation of 92%, an initial modulus of 27 g.p.d., a work recovery at 5% elongation of 66%, and a tensile recovery at 5% elongation of 87%. It is dyed to a moderate shade of blue with C.I. 62,055 dye, using the dyeing procedure described in Example 9.

The following example illustrates the preparation of the copolyester derived from pivalolactone and 1-phenyl-aziridine, XXXIV.

(XXXIV)

The copolyester accordingly consists of repeating structural units of oxycarbonyl-1,1-dimethyldimethylene (Formula XXIII) and oxycarbonyl-1,1-dimethyldimethylene-N-phenyliminodimethylene.

Example 20

A freshly-prepared solution of 1.19 g. (0.010 mol) of 1-phenylaziridine in 19.0 g. (0.190 mol) of pivalolactone is placed in a flame-dried polymer tube under nitrogen. After 30 minutes the solution is turbid, after which it is heated gently with a flame to boiling. A self-sustaining reaction takes place to leave a white polymer plug. This is ground and dried overnight in a 150° C. vacuum oven using a nitrogen bleed. The product contains 0.83% nitrogen by analysis, corresponding to incorporation of 6.4 mol percent of the amine-containing unit. The copolyester, poly(oxycarbonyl - 1,1 - dimethyldimethylene/oxycarbonyl - 1,1-dimethyldimethylene-N-phenyliminodimethylene) (93.6/6.4) has an inherent viscosity of 2.96 and a crystalline melting point of 214° C. The Z Number is 25.

The copolyester is spun and drawn as in Example 9 except that the spinning temperature is 227° C. and the draw ratio is 1.45×. After boil-off the filament has a denier of 4.4, a tenacity of 2.5 g.p.d., an elongation of 59%, an initial modulus of 21 g.p.d., a work recovery at 5% elongation of 52%, and a tensile recovery at 5% elongation of 77%. The fiber is dyed to a light shade of blue with C.I. 62,055 dye, using the dyeing procedure of Example 9.

The following example illustrates the preparation of the copolyester derived from pivalolactone and 1,3,3-trimethylazetidine, XXXV.

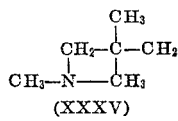
(XXXV)

The copolyester accordingly consists of repeating structural units of oxycarbonyl-1,1-dimethyldimethylene (Formula XXIII) and oxycarbonyl-1,1-dimethyldimethylene-N-methylimino-2,2-dimethyltrimethylene.

Example 21

To a flame-dried polymer tube 20.0 g. (0.20 mol) of pivalolactone and 0.50 g. (0.0052 mol) of 1,3,3-trimethylazetidine are added under an atmosphere of nitrogen, after which the contents of the tube are immediately frozen in a Dry Ice/acetone bath. The polymer tube is then evacuated, sealed, and placed in an autoclave which is pressurized to 10.6 kg./cm.² (150 p.s.i.). The autoclave is placed in an oil bath maintained at 250° C. for 15 minutes. The tube is then removed, cooled, and the polymer plug is removed, chopped up, and then ground in a micropulverizer. It has an inherent viscosity of 1.44 and contains 0.38% nitrogen by analysis, corresponding to 2.8 mol percent of the amine-containing unit. The Z Number is 4.4. The copolyester, poly(oxycarbonyl-1,1-dimethyldimethylene/oxycarbonyl - 1,1-dimethyldimethylene-N-methylimino-2,2-dimethyltrimethylene) (97.2/2.8), has a crystalline melting point of 229° C.

The copolyester is press-spun at 263° C. through an orifice 0.229 mm. (9 mils) in diameter, the resulting extruded filament being passed into ice water and wound at 298 meters/min. (326 y.p.m.). The filament is drawn 1.6× over a curved plate maintained at 165° C. and boiled off. The filament has a denier of 7.3, a tenacity of 3.0 g.p.d., an elongation of 62%, an initial modulus of 25 g.p.d., a work recovery at 5% elongation of 59%, and a tensile recovery at 5% elongation of 86%. It is dyed to a deep shade of blue with C.I. 62,055 dye, using the dyeing procedure described in Example 9.

The experiment is repeated, except that 1.00 g. (0.0103 mol) of 1,3,3-trimethylazetidine is used and the resulting copolyester is spun at 220° C. The polymer comprising the fibers contains 0.75% nitrogen by analysis, corresponding to incorporation of 5.7 mol percent of the amine-containing unit, and the polymer accordingly has the composition poly(oxycarbonyl-1,1-dimethyldimethylene/oxycarbonyl-1,1-dimethyldimethylene - N - methylimino-2,2-dimethyltrimethylene) (94.3/5.7). Its inherent viscosity is 0.81 and the crystalline melting point is 224° C. The Z Number is 4.4. When drawn 2× at 110° C., the fiber has a denier of 18, a tenacity of 1.1 g.p.d., an elongation of 38%, an initial modulus of 12 g.p.d., a work recovery at 5% elongation of 46%, and a tensile recovery at 5% elongation of 81%. It is dyed blue with C.I. 62,055 dye, using the dyeing procedure described in Example 9.

The following example illustrates the preparation of the copolyester derived from pivalolactone and 1-methyl-3,3-dibutylazetidine, a homologue of the compound of Formula XXXV.

Example 22

Into a round-bottom flask are placed 8.5 g. of 90% formic acid, 8.5 g. of 37% formaldehyde solution, and 9.3 g. (0.055 mol) of 3,3-dibutylazetidine. The reaction mixture is heated on a steam bath for 8 hours and then poured onto 100 ml. of ice cold 10% sodium hydroxide solution. The mixture is shaken and extracted twice with ether. The combined extracts are washed with a saturated sodium chloride solution, dried over magnesium sulfate, filtered, and concentrated to leave 10.0 g. of an oil which is then vacuum distilled through a short Claisen head at a temperature of 94–96° C. and a pressure of 17 mm. of mercury. The product, 1-methyl-3,3-dibutylazetidine, has a refractive index of 1.4390 after redistillation.

Analytical data: Calculated for $C_{12}H_{25}N$: C, 78.7; H, 13.7; N, 7.65. Found: C, 78.2; H, 13.7; N, 7.54.

In accordance with the general procedure of Example 21, 1.1 g. (0.006 mol) of 1-methyl-3,3-dibutylazetidine and 20.0 g. of pivalolactone (0.20 mol) are reacted at 245° C. for 20 minutes. The resulting copolyester has an inherent viscosity of 2.96, a crystalline melting point of 227° C., and contains 0.42% nitrogen by analysis, corresponding to 3.0 mol percent of the methyldibutylazetidine. The Z Number is 12. The product is accordingly poly(oxycarbonyl-1,1-dimethyldimethylene/oxycarbonyl-1,1-dimethyldimethylene - N - methylimino-2,2-dibutyltrimethylene) (97/3). The copolyester is press-spun at 270° C., drawn 1.7× at 110°, and boiled off. The filament has a denier of 7.6, a tenacity of 3.1 g.p.d., an elongation of 80%, an initial modulus of 19 g.p.d., a work recovery at 5% elongation of 62%, and a tensile recovery at 5% elongation of 88%. It is dyed blue with C.I. 62,055 dye, using the dyeing procedure described in Example 9.

The following example illustrates the preparation of the copolyester derived from pivalolactone and N-methylpyrrolidine, XXXVI.

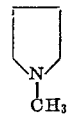
(XXXVI)

The copolyester accordingly consists of repeating structural units of oxycarbonyl-1,1-dimethyldimethylene (Formula XXIII) and oxycarbonyl-1,1-dimethyldimethylene-N-methyliminotetramethylene.

Example 23

Employing the general procedure of Example 9, 14.3 g. (0.143 mol) of pivalolactone is reacted with 0.64 g.

(0.0075 mol) of N-methylpyrrolidine in 150 ml. of acetonitrile. The product collected by filtration is dried overnight at 150° C. in a vacuum oven, using a nitrogen bleed. It contains 0.16% nitrogen by analysis, corresponding to incorporation of 1.2 mol percent of the amine-containing unit. The copolyester, poly(oxycarbonyl-1,1-dimethyldimethylene/oxycarbonyl-1,1 - dimethyldimethylene-N-methyliminotetramethylene) (98.8/1.2) has a crystalline melting point of 233° C. and an inherent viscosity of 1.46, corresponding to a molecular weight of about 40,500 as estimated by the empirical equation given in Example 9. The Z Number is 1.9. A small sample of the product collected by filtration in the above procedure but dried over $P_2O_5$ under vacuum at room temperature instead of 150° C. exhibits an inherent viscosity of 1.04, corresponding to a molecular weight of about 26,000 as estimated by the same equation. The Z Number is 1.2, showing that in this case appreciable combination occurred during the preparation. The yield of copolyester is 14.2 g. Fibers spun and drawn as in Example 9 are dyed blue with C.I. 62,055 dye, using the dyeing procedure described in Example 9.

The following example illustrates the preparation of the copolyester derived from pivalolactone and 2-methylisoindoline, XXXVII, which may also be named as 1-methyl-3,4-benzopyrrolidine.

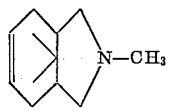

(XXXVII)

The copolyester accordingly consists of repeating structural units of oxycarbonyl-1,1-dimethyldimethylene (Formula XXIII) and oxycarbonyl-1,1-dimethyldimethylene-N-methyliminomethylene-1,2-phenylenemethylene.

Example 24

Employing the general procedure of Example 9, 14.3 g. (0.143 mol) of pivalolactone is reacted with 1.90 g. (0.0142 mol) of 2-methylisoindoline in 150 ml. of anhydrous acetonitrile. The product collected by filtration is dried overnight at 140° C. in a vacuum oven using a nitrogen bleed. It contains 0.13% nitrogen by analysis, corresponding to 0.9 mol percent incorporation. The yield of copolyester, poly(oxycarbonyl-1,1-dimethyldimethylene/oxycarbonyl-1,1 - dimethylene-N-methyliminomethylene-1,2-phenylenemethylene) (99.1/0.9), is 13.2 g. It has an inherent viscosity of 1.37 and a crystalline melting point of 229° C. The Z Number is 1.3.

A tough, flexible film is pressed at 225° C. and 500 p.s.i. in a Carver press. It is dyed a medium shade of blue with C.I. 62,055 dye, using the dyeing procedure of Example 9.

The following examples illustrate the preparation of copolyesters from lactones other than pivalolactone.

Example 25

A solution of 0.54 g. (0.0048 mol) of quinuclidine in 150 ml. of anhydrous acetonitrile is reacted with 15.0 g. (0.117 mol) of 2,2-diethyl-3-propiolactone in general accordance with the procedure of Example 9, except that refluxing is terminated after one hour and the product is dried at 140° C. The yield of copolyester is 13.9 g. It has an inherent viscosity of 2.06 and a crystalline melting point of 208° C.

The copolyester so obtained, to which 0.50 wt. percent of tri-t-butylphenol has been added, is press-spun at 293° C. as in Example 9. The resulting fibers contain 0.17% nitrogen by analysis, corresponding to incorporation of 1.6 mol percent of the amine-containing unit, and the copolymer of which the fibre is spun accordingly has the composition, poly(oxycarbonyl-1,1 - diethyldimethylene/oxycarbonyl-1,1-diethyldimethylene-1,4 - piperidinediyldimethylene) (98.4/1.6). The Z Number is 3.9. The filament is drawn 2.3× at 175° C. and boiled off. The filament has a denier of 2.7, a tenacity of 5.2 g.p.d., an elongation of 17%, an initial modulus of 86 g.p.d., a work recovery at 5% elongation of 59%, and a tensile recovery at 5% elongation of 80%. It is dyed a medium shade of blue with C.I. 62,055, dye, using the dyeing procedure described in Example 9.

Example 26

A solution of 0.44 g. (0.0040 mol) of quinuclidine in 150 ml. of anhydrous acetonitrile is reacted with 15.0 g. (0.096 mol) of 2,2-di-n-propyl-3-propiolactone in general accordance with the procedure of Example 9, except that refluxing is terminated after one hour and the product is dried at 140° C. The product contains 0.11% nitrogen by analysis, corresponding to incorporation of 1.2 mol percent of the quinuclidine. The yield of copolyester, poly-(oxycarbonyl - 1,1-di-n-propyldimethylene/oxycarbonyl-1,1-di-n-propyldimethylene - 1,4 - piperidinediyldimethylene) (98.8/1.2), is 12.8 g. It has an inherent viscosity of 1.68 and a crystalline melting point of 263° C. The Z Number is 2.3.

The copolyester so obtained, to which 0.50 wt. percent of tri-t-butylphenol has been added, is press-spun at 282° C., drawn 2.7× at 175° C., and boiled off. The filament has a denier of 4.2, a tenacity of 2.6 g.p.d., an elongation of 19%, an initial modulus of 76 g.p.d., a work recovery at 5% elongation of 42%, and a tensile recovery at 5% elongation of 70%. It is dyed a light shade of blue with C.I. 62,055 dye, using the dyeing procedure described in Example 9.

A wide variety of acid dyes are suitable for dyeing the copolymers of the present invention. In place of the blue acid dye identified by Colour Index No. 62,055 in the above examples, acid dyes identified by Colour Index Nos. 18,820 (yellow) and 61,570 (green) may be employed, for instance.

Typical 2,2-dialkylpropiolactones which may be employed to form the novel copolyesters of the invention, in addition to the lactones disclosed in the examples above, include 2-methyl-2-ethyl - 3 - propiolactone (Q=—$CH_3$, Q'=—$CH_2CH_3$), 2-methyl-2-neopentyl-3-propiolactone (Q=—$CH_3$, Q'=($CH_3$)$_3$C $CH_2$—), and 2,2-di-n-butyl-3-propiolactone (Q=Q'=—$CH_2CH_2CH_2CH_3$). An example in which Q and Q' are singly bonded is 2,2-pentamethylene-3-propiolactone

An example in which Q and Q' are doubly bonded is spironorcamphane-2,3-oxetanone-1,2

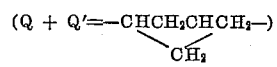

Other lactones of the type shown in Formula XVI are disclosed by Etienne and Fisher in their French Patent 1,231,163.

As described above, when a 2,2-dialkyl-3-propiolactone is used as the starting material for preparing the novel copolymer of the invention, the polymerization reaction is initiated by the co-monomer, which comprises a cyclic tertiary amine of the class consisting of (1) 1-azapolycycloalkanes consisting of one nitrogen atom and from 6 to 12 carbon atoms in the polycyclic ring system; (2) N-hydrocarbylaziridines; (3) N-hydrocarbylazetidines; and (4) N-hydrocarbylpyrrolidines. Instances of such cyclic tertiary amines, in addition to those disclosed in the examples above, include 1-azabicyclo[3.2.1]octane, 1-azabicyclo[4.3.0]nonane, 1-azabicyclo[3.2.2]nonane, 3, 3a,4,5,6,6a - hexahydroethanylidenecyclopenta[c]pyrrole, benzoquinuclidine, 3-methyl-3-aza-bicyclo[3.2.0]heptane, and many others.

While it has been known previously that tertiary amines initiate the polymerization of 2,2-dialkylpropiolactones, polymers of useful molecular weight typically are found to contain only a trace of nitrogen, apparently corresponding to no more than one nitrogen atom per molecule of polymer. Even cyclic tertiary amines outside the scope of the novel process defined above, e.g., N-ethylpiperidine, lead to polymers containing only a trace of nitrogen. The following example illustrates this surprising contrast:

Example 27

Employing the general procedure of Example 9, 40 g. (0.40 mol) of pivalolactone is reacted with 2.22 g. (0.020 mol) of quinuclidine in 400 ml. of anhydrous acetonitrile. The product collected by filtration is dried for 16 hours in a vacuum oven at 45° C. The dried product contain 0.32% nitrogen, corresponding to 2.3 mol percent incorporation of the quinuclidine (5.0 mol percent charged). The product has an inherent viscosity of only 0.31 (Z Number 0.5); however, after it is heated 16 hours at 150° C., the inherent viscosity is 2.12, and the Z Number is increased to 5.9.

The experiment is repeated again with three other tertiary amines (N-ethylpiperidine, N-methylpiperidine and N-methylhexamethyleneimine) and one secondary amine (piperidine). The results of all of these experiments are summarized in the following table:

| Amine initiator | Mol percent charged | Inherent viscosity after heating at 150° C. | Mol percent nitrogen in product | Z number |
|---|---|---|---|---|
| (1) Quinuclidine | 5 | 2.12 | 2.3 | 5.9 |
| (2) N-ethylpiperidine | 5 | 2.23 | 0.1 | 0.3 |
| (3) N-methylpiperidine | 5 | 0.88 | 0.4 | 0.3 |
| (4) N-methylhexamethyleneimine | 5 | 0.77 | 0.5 | 0.4 |
| (5) Piperidine | 5 | 0.10 | 5.0 | 0.3 |

In the table above, it will be noted that only the quinuclidine yields a high molecular weight copolymer having a nitrogen content within the desired range, that is, a Z Number greater than unity. The polymer obtained from the secondary amine has a very low inherent viscosity, while the nitrogen content of the polymers from the three cyclic tertiary amines of entries 2–4 is quite low.

To illustrate the low degree of incorporation of tertiary amines outside the scope of the process defined above when melt polymerization is employed, the general procedure of Example 10 is repeated, substituting the indicated amines in the indicated amounts for the quinuclidine. The results of these experiments, including the results obtained with quinuclidine as shown in Example 10, are summarized in the following table:

| Amine initiator | Mol percent charged | Inherent viscosity after heating at 130° C. | Mol percent nitrogen in product | Z number |
|---|---|---|---|---|
| (1) Quinuclidine | 3 | 5.94 | 0.8 | 7.4 |
| (2) N-ethylpiperidine | 5 | 3.22 | 0.1 | 0.4 |
| (3) N-methylpiperidine | 5 | 1.34 | 0.1 | 0.1 |
| (4) N-methylhexamethyleneimine | 5 | 0.98 | 0.3 | 0.3 |
| (5) Dimethylaniline | 1.6 | 3.33 | 0.1 | 0.4 |
|  | 0.4 | 2.36 | 0.1 | 0.3 |
| (6) Trimethylamine | 1.0 | 2.57 | 0.1 | 0.3 |

In the table above it is again noted that only the quinuclidine yields a high molecular weight copolymer having a nitrogen content within the desired range. The Z numbers for the other amines are all very low.

What is claimed is:

1. A novel copolyester having between about 75 and 99.5 mol percent of the following recurring structural unit:

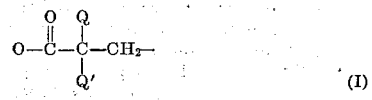

and between about 0.5 and 25 mol percent of the following recurring structural unit:

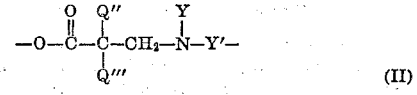

wherein Q, Q', Q" and Q'" are alkyl radicals of up to about six carbon atoms; Q may be joined to Q', and Q" may be joined to Q'" to form alicyclic rings; Y and Y' are hydrocarbon radicals of up to about ten carbon atoms which may be joined to form rings; and the product of the mol percent of the unit of Formula II and the inherent viscosity to the 1.25 power is greater than 1, a solution of 0.5 gram of polymer in 100 ml. of trifluoroacetic acid at 30° C. being used to measure said inherent viscosity.

2. The product of claim 1 wherein the ratio of the units corresponding to Formulas I and II are in the range of 95/5 to 99.5/0.5.

3. The product of claim 1 wherein Q and Q' are methyl.

4. The copolyester of claim 3 wherein the unit corresponding to Formula II is oxycarbonyl-1,1-dimethyldimethylene-1,4-piperidinediyldimethylene.

5. The copolyester of claim 3 wherein the unit corresponding to Formula II is oxycarbonyl-1,1-dimethyldimethylene-N-ethyliminodimethylene.

6. The copolyester of claim 3 wherein the unit corresponding to Formula II is oxycarbonyl-1,1-dimethyldimethylene-N-phenyliminodimethylene.

7. The copolyester of claim 3 wherein the unit corresponding to Formula II is oxycarbonyl-1,1-dimethyldimethylene-N-methylimino-2,2-dimethyltrimethylene.

8. The copolyester of claim 4 wherein the unit corresponding to Formula II is oxycarbonyl-1,1-dimethyldimethylene-N-methyliminotetramethylene.

9. A fiber of the copolyester of claim 1.

References Cited

UNITED STATES PATENTS 3,240,720   3/1966   Smith _____ 260—78.3

FOREIGN PATENTS 1,231,163   9/1960   France.
766,347   1/1957   Great Britain.

WILLIAM H. SHORT, Primary Examiner.

R. T. LYON, Assistant Examiner.